April 11, 1933.  W. D. ALLEN  1,903,605
AUTOMATIC NOZZLE OR FAUCET
Filed Aug. 12, 1931
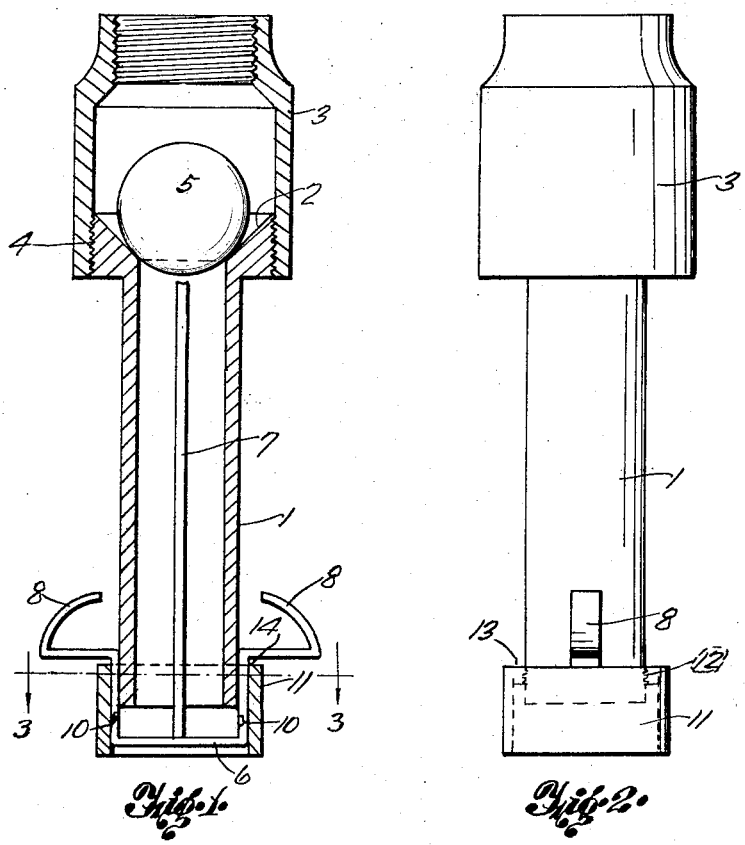
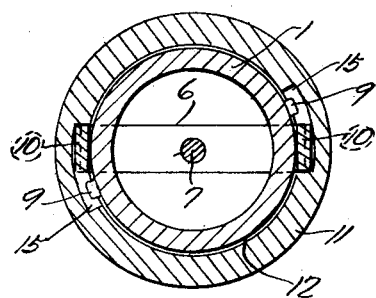
INVENTOR:
William D. Allen
BY Adam E. Fisher
ATTORNEY Patented Apr. 11, 1933

1,903,605

UNITED STATES PATENT OFFICE

WILLIAM D. ALLEN, OF KOSSE, TEXAS

AUTOMATIC NOZZLE OR FAUCET

Application filed August 12, 1931. Serial No. 556,560.

This invention is an automatic nozzle or faucet for use upon hose or drinking fountains, or for any similar purpose.

The primary purpose is to provide in relatively simple, practical and efficient form a nozzle or faucet having a valve controlling the flow of water therethru, with means for automatically opening the valve as the device is applied to its intended use.

Another object is to provide a nozzle tube or casing, having a ball valve or the like housed in one end, an operating bracket mounted at the opposite end, and a push rod extended from the bracket thru the tube and adapted to impinge upon the valve for opening same, the said bracket being adapted to move longitudinally of the nozzle tube for opening or closing the valve and to rotate for releasably locking the bracket to hold the valve open.

With the foregoing and such other objects and advantages as may appear, attention is directed to the following specification and accompanying drawing, wherein:

Figure 1 is a longitudinal section thru a faucet assembly embodying my invention.

Figure 2 is an elevation of the faucet assembly of Figure 1, taken at an angle of ninety degrees.

Figure 3 is a transverse section on the line 3—3 of Figure 2.

In combination with a faucet tube 1 having a valve seat 2 at one end and a valve housing and hose connection 3 threadedly engaging the valve seat as shown at 4, there being a conventional form of valve, as for example the ball 5 seated upon the seat 2, my invention comprises an operating bracket 6 movably mounted upon the opposite end of the tube 1 and carrying the push rod 7 which extends thru the tube and is adapted to impinge upon the valve 5 to open same to the flow of water or other liquid. The bracket 6 is made of a narrow strip of sheet metal or other suitable material and is substantially U-shaped on its side elevation as shown in Figure 1. This bracket is adapted to freely straddle the end of the tube 1, and is provided with terminal hooks 8 to serve as contacts or finger holds. These hooks 8 obviously may be made as resilient as may be desired. The tube 1 at this end is provided with small diametrically positioned lugs 9 adapted to register with and engage in notches 10 cut in the lateral and opposite margins of the rising portions or arms of the bracket 6. The arrangement is such that the lugs 9 will enter the notches 10 when the bracket 6 is pushed inward upon the tube 1 as far as possible, or into contact therewith, and then rotated. A reverse movement will of course free the bracket. The push rod 7 is just long enough to unseat the valve 5 when the bracket 6 is pushed inward as just described. An open cap 11 is threaded at 12 upon the end of the tube 1 over the bracket 6, the cap having an inturned threaded flange 13 for engaging the tube. Recesses 15 are cut in the flange 13 to permit the passage of the bracket arms and to permit the partial rotation in either direction of the bracket.

In operation, the pressure of the liquid will normally hold the valve 5 closed. The valve is opened for flow of liquid by merely pressing the bracket 6 inwardly. When it is desired to lock the valve open the bracket 6 is rotated so that the lugs 9 will engage in the notches 10. Ordinarily the bracket 6 would be operated thru the hooks 8, and by making same sufficiently resilient, danger of breakage is minimized.

While I have herein described a certain specific method of constructing and assembling the elements of my invention, it is understood same may be varied in minor details, not departing from the spirit of my invention as defined in the appended claim.

I claim:

In combination with a faucet tube having a valve seated at one end, an operating bracket having arms mounted at the opposite end and adapted for both longitudinal and rotative movement relative to the tube, a push rod extended from the bracket thru the tube to the valve and adapted to open the latter on the inward movement of the former, cooperating means upon tube and bracket for locking the latter in its inmost position upon its rotation, and an open cap seated over the bracket, the said cap having an inturned flange for engaging the tube, the said flange being recessed to provide passages for the bracket arms.

In testimony whereof I affix my signature.

WILLIAM D. ALLEN.